United States Patent
Futschik et al.

[11] Patent Number: 6,062,631
[45] Date of Patent: May 16, 2000

[54] VEHICLE DOOR WITH AN INTERIOR TRIM AND METHOD OF CONSTRUCTING SAME

[75] Inventors: Hans-Dieter Futschik, Gechingen; Norbert Weber, Bondorf, both of Germany

[73] Assignee: Daimlerchrysler AG, Germany

[21] Appl. No.: 09/114,153

[22] Filed: Jul. 13, 1998

[30] Foreign Application Priority Data

Jul. 12, 1997 [DE] Germany .................. 197 29 901

[51] Int. Cl.$^7$ .................. B60J 5/00; B62D 25/14
[52] U.S. Cl. .................. 296/146.7; 296/74
[58] Field of Search .................. 296/70, 152, 153, 296/74, 146.7; 49/501, 502

[56] References Cited

U.S. PATENT DOCUMENTS

| | | | |
|---|---|---|---|
| 5,095,659 | 3/1992 | Benoit et al. | 296/146.7 |
| 5,531,499 | 7/1996 | Vecchio et al. | 296/146.7 |
| 5,702,785 | 12/1997 | Kuebler et al. | |

FOREIGN PATENT DOCUMENTS

| | | |
|---|---|---|
| 0364102A2 | 4/1990 | European Pat. Off. |
| 4414302 C1 | 6/1995 | Germany |
| 4433426A1 | 3/1996 | Germany |
| 19534661A1 | 7/1996 | Germany |
| 19505214A1 | 8/1996 | Germany |
| 19524602A1 | 1/1997 | Germany |
| 404271918 | 9/1992 | Japan .................. 296/146.7 |
| WO97/03806 | 2/1997 | WIPO |

OTHER PUBLICATIONS

Patent Office Action, France, Mar. 5, 1999.

*Primary Examiner*—B. Dayoan
*Assistant Examiner*—Greg Blankenship
*Attorney, Agent, or Firm*—Evenson, McKeown, Edwards & Lenahan, P.L.L.C.

[57] ABSTRACT

In a vehicle door with a basic body in the form of a body-in-white that includes the exterior sheet metal, internal trim, and a partial area within this interior trim with functional parts that are visible and/or operable from the vehicle interior, the partial area must be installed with high dimensional accuracy. For this purpose, the partial area is formed by an insert part that is permanently attached to the body-in-white and the interior trim, is separate from, and has a reinforcing effect relative to the remaining area of the door interior trim.

2 Claims, 2 Drawing Sheets

VEHICLE DOOR WITH AN INTERIOR TRIM AND METHOD OF CONSTRUCTING SAME

BACKGROUND AND SUMMARY OF THE INVENTION

This application claims the priority of German application 197 29 901.6-21, filed in Germany on Jul. 12, 1997, the disclosure of which is expressly incorporated by reference herein.

The invention relates to a vehicle door with a basic body in the form of a body-in-white that includes the exterior sheet metal, an interior trim, and a partial area within this interior trim with functional parts that are visible and/or operable from the vehicle interior.

In such a vehicle door, the invention is concerned with the problem of being able to locate the partial area within the door with high accuracy in terms of tolerance, especially when then partial area projects into a marginal area of the door intended to fit tightly against a part of the body located apart from the door.

This problem is solved according to certain preferred embodiments of the invention by providing a front vehicle door with a basic body in the form of a body-in-white that includes an outside sheet metal, a door interior trim, and a partial area with functional parts operable from a vehicle interior space, wherein the partial area is designed as a separate insert part that acts as reinforcement with respect to the remaining area of the door interior trim and is permanently connected with the body-in-white and the door interior trim, and constitutes a direct laterally abutting extension of a front vehicle instrument panel when in an in use position in a vehicle.

The invention is based on the following consideration.

The door interior trim, depending on the materials used fox this purpose, constitutes a unit that is intrinsically unstable, whose stability is achieved only by attaching it to the body (body-in-white) at the door. Because of this design, the mounting elements must in part be located at a distance that is too great for achieving sufficient stability. As a result, the door interior trim can reveal deviations from its installation position within the plane of the door. This results in problems with fit and hence with quality that can be partially overcome only by expensive finishing work. It is usually impossible to provide reinforcing elements on the back of the door trim because of the supporting structure of the door body and the limited space that results.

The insert part according to the invention, to be mounted directly on the basic body of the door, can be a plastic supporting part that can serve in this case in an advantageous manner as a stabilizing component, especially for partial areas of the door interior trim. As a result, increased reliability of fit is achieved in this area at the same time. This is especially important when the insert part is located inside the front door of a vehicle and forms there a laterally extended area of the instrument panel of the motor vehicle (7 in FIG. 3). The boundary area opposite the instrument panel is an area in which high accuracy of fit is absolutely necessary for esthetic reasons.

Other objects, advantages and novel features of the present invention will become apparent from the following detailed description of the invention when considered in conjunction with the accompanying drawings.

DETAILED DESCRIPTION OF THE DRAWINGS

Figure 1:
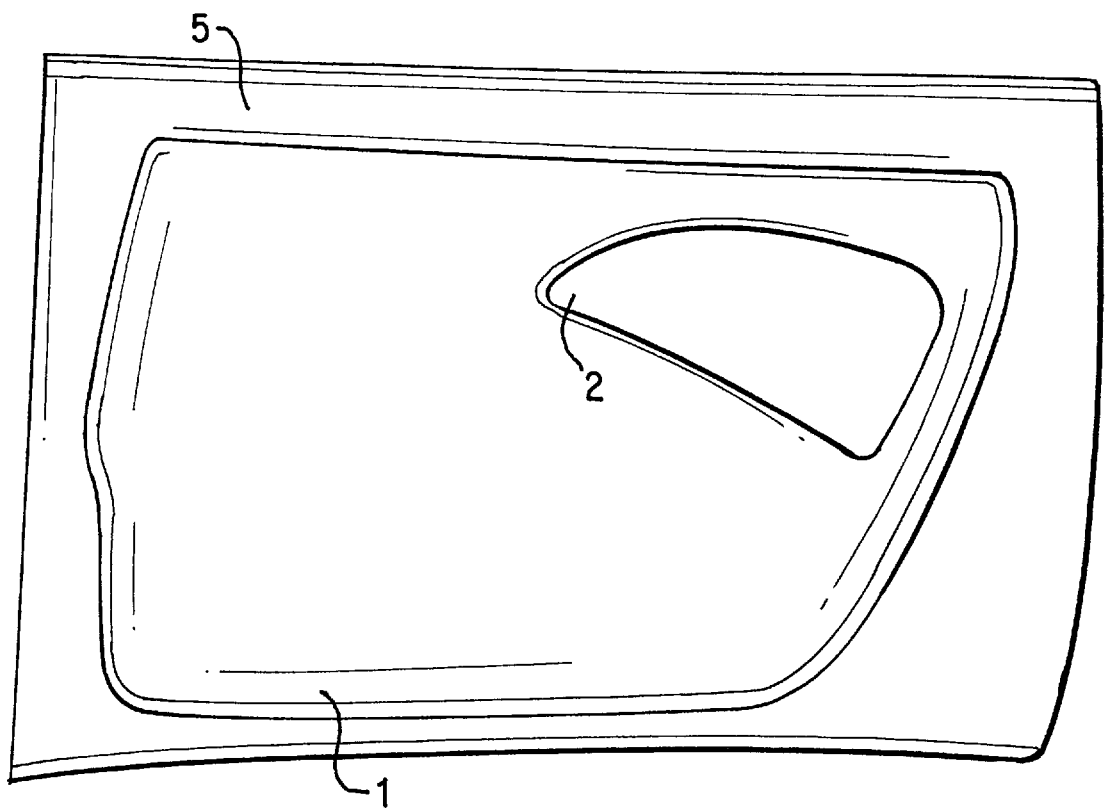
FIG. 1 is a view of the interior trim of a front vehicle door in a schematic simplified view constructed according to the preferred embodiment of the invention.
Figure 2:
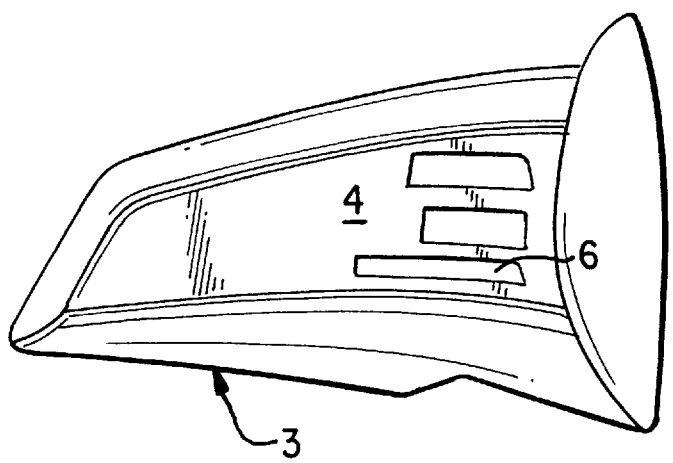
FIG. 2 is a perspective, schematically simplified view of an insert part for the door of FIG. 1.
Figure 3:
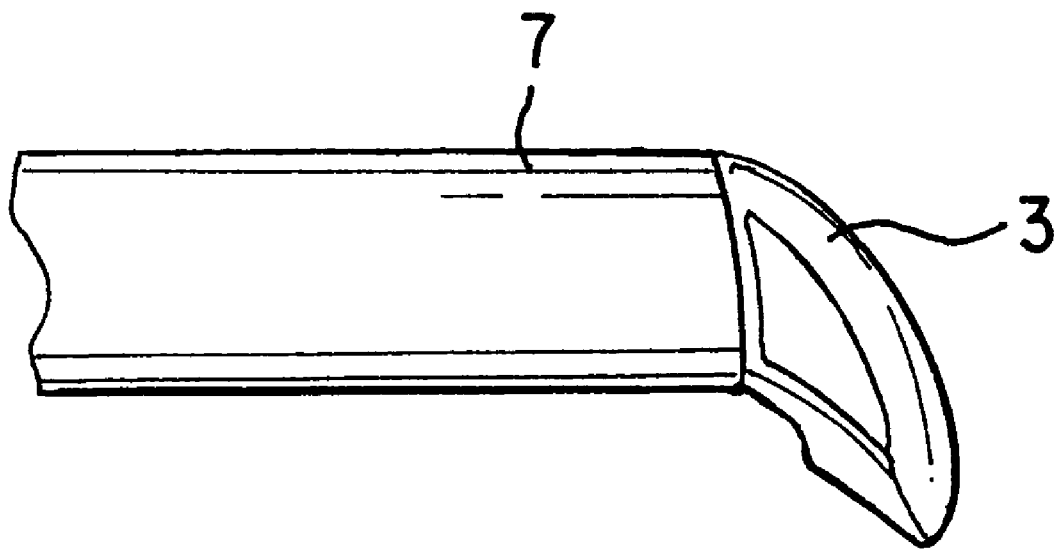
FIG. 3 is a schematically simplified view of the insert part laterally abutting an instrument panel.

An interior trim 1 is fastened to a body-n-white of a vehicle door 5, by clipping and screwing.

An insert part 3 that stiffens this trim is inserted into an opening 2 provided in interior trim 1 and is connected there with the insert part and the body-in-white. The connection is preferably made by clipping.

Insert part 3 has an area 4 to receive functional parts 6 that are operable and/or visible from the interior of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A front vehicle door comprising a basic body in the form of a body-in-white, comprising:
   an outside sheet metal;
   a door interior trim having an opening; and
   a part comprising functional parts operable from a vehicle interior space that laterally abuts a front vehicle instrument panel when the vehicle door is closed,
   wherein the part is a separate insert that is permanently connected to the body-in-white and door interior trim through the opening and acts as a reinforcement with respect to the door interior trim.

2. A method of constructing a front vehicle door for a passenger vehicle, comprising:
   providing a basic body in the form of a body-in-white,
   fastening a door interior trim having an opening to the body-in-white,
   providing a separate insert part in the opening, wherein the insert part acts as a reinforcement with respect to the door interior trim and comprises functional parts operable from a vehicle interior space, and
   permanently connecting the insert part to the body-in-white and the door interior trim to form a direct laterally abutting extension of a front vehicle instrument panel when the door is closed.

* * * * *